United States Statutory Invention Registration [19]

[11] Reg. Number: H703

Repperger et al. [43] Published: Nov. 7, 1989

[54] MANUAL CONTROL APPARATUS WITH ELECTABLE MECHANICAL IMPEDANCE

[75] Inventors: Daniel W. Repperger, Vandalia; Augustus Morris, Jr., Trotwood, both of Ohio

[73] Assignee: The United States of America as represented by the Secretary of the Air Force, Washington, D.C.

[21] Appl. No.: 79,323

[22] Filed: Jul. 30, 1987

[51] Int. Cl.[4] ..... B64C 13/04

[52] U.S. Cl. ..... 244/221; 244/228

[58] Field of Search ..... 244/220, 223, 221, 226–228, 244/230, 75 R, 76 R; 415/5; 901/9

[56] References Cited

U.S. PATENT DOCUMENTS

| | | | |
|---|---|---|---|
| 4,071,209 | 1/1978 | Hart | 244/83 D |
| 4,168,045 | 9/1979 | Wright et al. | 244/17.13 |
| 4,477,043 | 10/1984 | Repperger | 244/223 |
| 4,632,341 | 12/1986 | Repperger et al. | 244/230 |

OTHER PUBLICATIONS

McFadden, "Cockpit Control Loader", McFadden Systems, Inc., sales brochure.

*Primary Examiner*—Deborah L. Kyle

*Assistant Examiner*—Michael J. Carone

*Attorney, Agent, or Firm*—Donald J. Singer; Thomas L. Kundert; Gerald B. Hollins

[57] ABSTRACT

Mechanical impedance determining apparatus for the control stick of an aircraft, an aircraft simulator, or non-aircraft apparatus such as a video game. Impedance determination is accomplished by a feedback path connected from output to input of the control stick with feedback transfer function coefficients determined by operator election in order to achieve positive, negative, or zero mechanical impedance at the control stick. Electrical network and computer realization of the feedback signal transfer function are contemplated using s plane pole descriptions of overall stick and feedback path characterizing transfer functions.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MANUAL CONTROL APPARATUS WITH ELECTABLE MECHANICAL IMPEDANCE

RIGHTS OF THE GOVERNMENT

The invention described herein may be manufactured and used by or for the Government of the United States for all governmental purposes without the payment of any royalty.

BACKGROUND OF THE INVENTION

This invention relates to the field of human actuated control devices such as the joystick control or control stick or control column used in video games, aircraft flight surface control, construction machinery maneuvering and in other human operated apparatus.

The coupling system by which information from an aircraft pilot is transmitted to the aircraft control surfaces and the resulting response of the aircraft to control surface position changes has reached a refined state of evolution. In most present-day commercial and military aircraft, for example, the use of hydraulic or other power assistance arrangements is routine and the achievement of realistic stick "feel"—even in the presence of this power assistance has been enhanced with each new generation of aircraft.

With respect to control stick to aircraft dynamic response for example, it is now recognized that a degree of dynamic instability or system overshoot followed by damped oscillation can be desirable in high-performance aircraft such as a military fighter. In the F-16 aircraft currently used by the U.S. Air Force, for example, in the roll axis mode, the roll dynamics are intentionally made to be slightly unstable in this manner in order to achieve a quick response to the human pilot commands. Fighter pilots are known to prefer this type of pilot-to-aircraft interaction as a result of a desire to have the aircraft be extremely sensitive to commands. Another example of such controls is found in present-day helicopters wherein the control stick system dynamics are inherently unstable but also provide the helicoper with the capability for rapid maneuvering. In the present invention, this interface between the human operator and the controlled apparatus is considered in terms of the control stick transfer functions and mechanical impedances.

SUMMARY OF THE INVENTION

In the present invention, the control stick of an aircraft, an aircraft simulator, a video game, or other human operated apparatus is characterized with respect to its mechanical transfer function. In this characterization, the relationship of output and input parameters is expressed in mathematical terms and the resulting transfer function modified to have operator selected characteristics. Modification is achieved through the addition of a parameter adjustable feedback path between output and input nodes of the control stick. Operator adjustment of three coefficients in the feedback transfer function, coefficients corresponding to mass, damping, and spring constant thereby enables the attainment of control stick impedances which vary from positive to zero to negative values.

An object of the present invention is therefore to provide a joystick control apparatus in which the mechanical impedance of the joystick is variable.

Another object of the invention is to provide a control stick which is capable of a selected degree of dynamic response instability.

Another object of the invention is to provide a control stick in which the mechanical impedance is variable over a zero centered range.

Another object of the invention is to provide a joystick control arrangement in which each of the mechanical characteristics of mass, damping, and spring constant is independently variable.

Another object of the invention is to provide a control arrangement which may be adapted to a variety of different joystick configurations including the control column mounted wheel used in the large aircraft art.

Another object of the invention to provide a joystick controller which may be used in aircraft, video game, or other utilization environments.

Another object of the invention to provide a control stick apparatus in which certain of the transfer function coefficients may have negative numerical values.

Another object of the invention is to provide a control stick having selectable mechanical impedance characteristics and low fabrication cost.

Additional objects and features of the invention will be understood from the following description and the accompanying drawings.

These and other objects are achieved by transducer apparatus for generating electrical signals representative of human operator control movements which includes a manually operable controlling element characterized by a first complex mathematical transfer function relating mechanical input and electrical output functions thereof, feedback signal path apparatus connected between electrical output of the controlling element and the mechanical input thereof, the feedback signal path apparatus being characterized by a second complex mathematical transfer function, adjustment means for selecting the value of mathematical coefficients appearing in the second transfer function and thereby the response to stimulus character of the transducer apparatus, the adjustment means including an adjustment range which includes a region of dynamic response instability.

DETAILED DESCRIPTION

Figure 1:
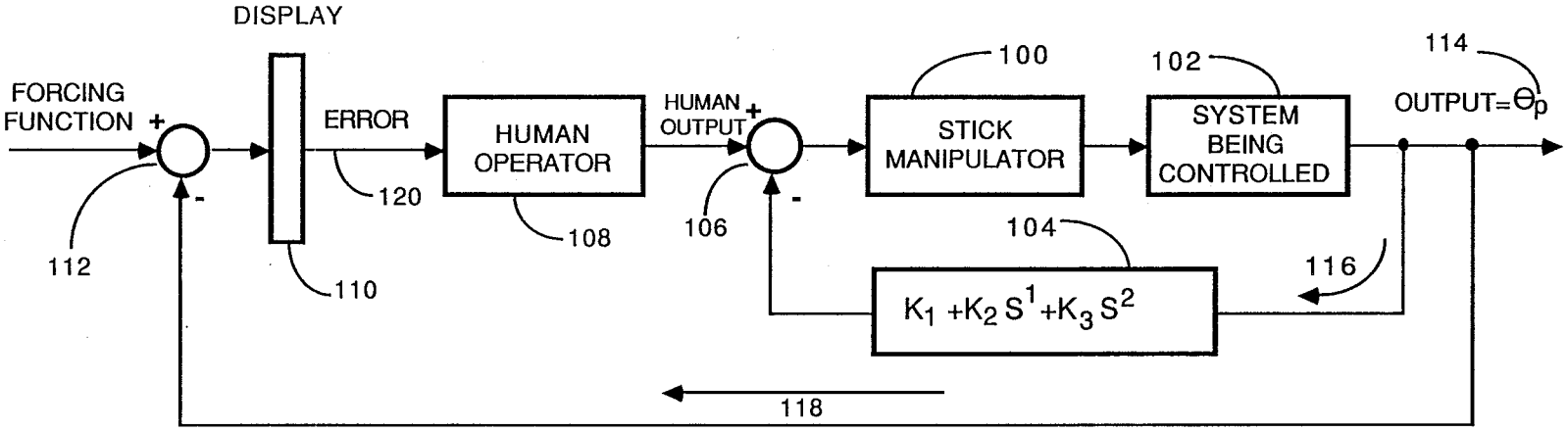
PRIOR ART Fig. 1
FIG. 1 shows a prior art control stick system arrangement.

FIG. 1 in the drawings shows a prior art control stick system wherein a stick manipulator or control column or other manually operated input transducer device 100 receives input force from a human operator 108 and from a feedback loop path 116 by way of a force summing apparatus 106. The feedback loop 116 in FIG. 1 includes both the system being controlled 102 and a feedback transfer function 104. The FIG. 1 prior art system also includes a second overall feedback path 118 for the output signal 114. This second feedback signal may, for example, be in the form of an image observed by the human operator 108 together with the summation of input and feedback signals at 112 to form a display image 110 and an error signal 120 that directs the human operator 108 input to the force summer 106. The FIG. 1 control stick system is more fully described in U.S. Pat. No. 4,477,043 to D. W. Repperger.

The FIG. 1 system notably includes two feedback paths 116 and 118 which utilize the system output signal $\theta p$ 114. This use of the output signal from the system being controlled as the source of feedback signals for error determination is in accordance with the conventional wisdom for feedback systems but, however, in some instances, may be accomplished only with some difficulty in obtaining the measurement $\theta p$. Explicit information regarding the signal $\theta p$ 114 and its derivatives is usually required in order to enable one or more of the feedback paths 116 and 118. Measurement of the variable $\theta p$ 114 may, however, be difficult to accomplish in a real world system, since for example, in an aircraft a signal representing the variable $\theta p$ (t) may in fact represent aircraft attitude and may therefore be corrupted by noise disturbances such as wind buffeting.

Figure 2:
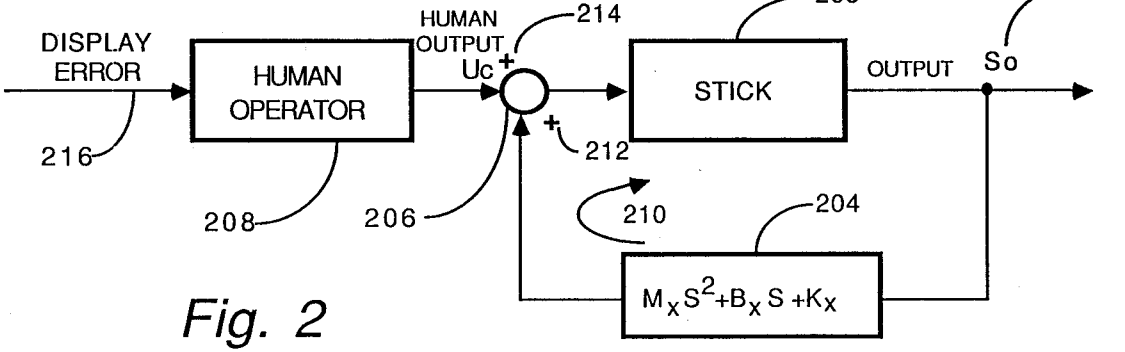
FIG. 2 shows the signal arrangement for a control stick according to the present invention.

FIG. 2 of the drawings shows an improved control stick system made in accordance with the present invention. In the FIG. 2 system a human operator 208 applies controlling forces to a stick manipulator 200 in order to generate a stick output signal $S_o$ 202. The human operator 208 in FIG. 2 operates in response to an error signal 216 which may be visual, aural, tactile, or of other sensory perception in nature. As a result of this signal, the operator 208 provides a manual input to the manipulator 200 by way of a force summation apparatus 206. The feedback path 210 in FIG. 2 includes the transfer function 204 and extends between the output and input nodes of the stick manipulator 200. Notably, this path excludes use of signals originating in the system being controlled, as was indicated at 102 in the system of FIG. 1. The summation of human operator and feedback signals in the force summation apparatus 206 of FIG. 2 is shown to involve two similarly polarized inputs to the summation apparatus 206, as are indicated at 212 and 214 in FIG. 2. The similar polarizations of the feedback and human operator input signals to the force summation apparatus 206 in FIG. 2 contrasts with the offsetting or negative polarizations of these signals at 106 in FIG. 1.

Use of the stick output signal $S_o$ 202 as a signal source for the feedback path 210 in FIG. 2 is a notable aspect of the FIG. 2 stick system, since such feedback signal origination precludes incorporation of noise signals and other difficulties attending the FIG. 1 feedback arrangement. By way of the feedback path illustrated in FIG. 2, the control stick system may also be arranged as a self-contained or even portable and battery operated apparatus such as might, for example, permit individual tailoring of a control stick system to different aircraft pilots or enable use of the control stick system in environments having limited access to electrical or other forms of energy. A portable battery operated control stick with the provision of stick surrounding feedback and limited electrical energy usage would also be applicable to the video game environment described above.

Figure 3:
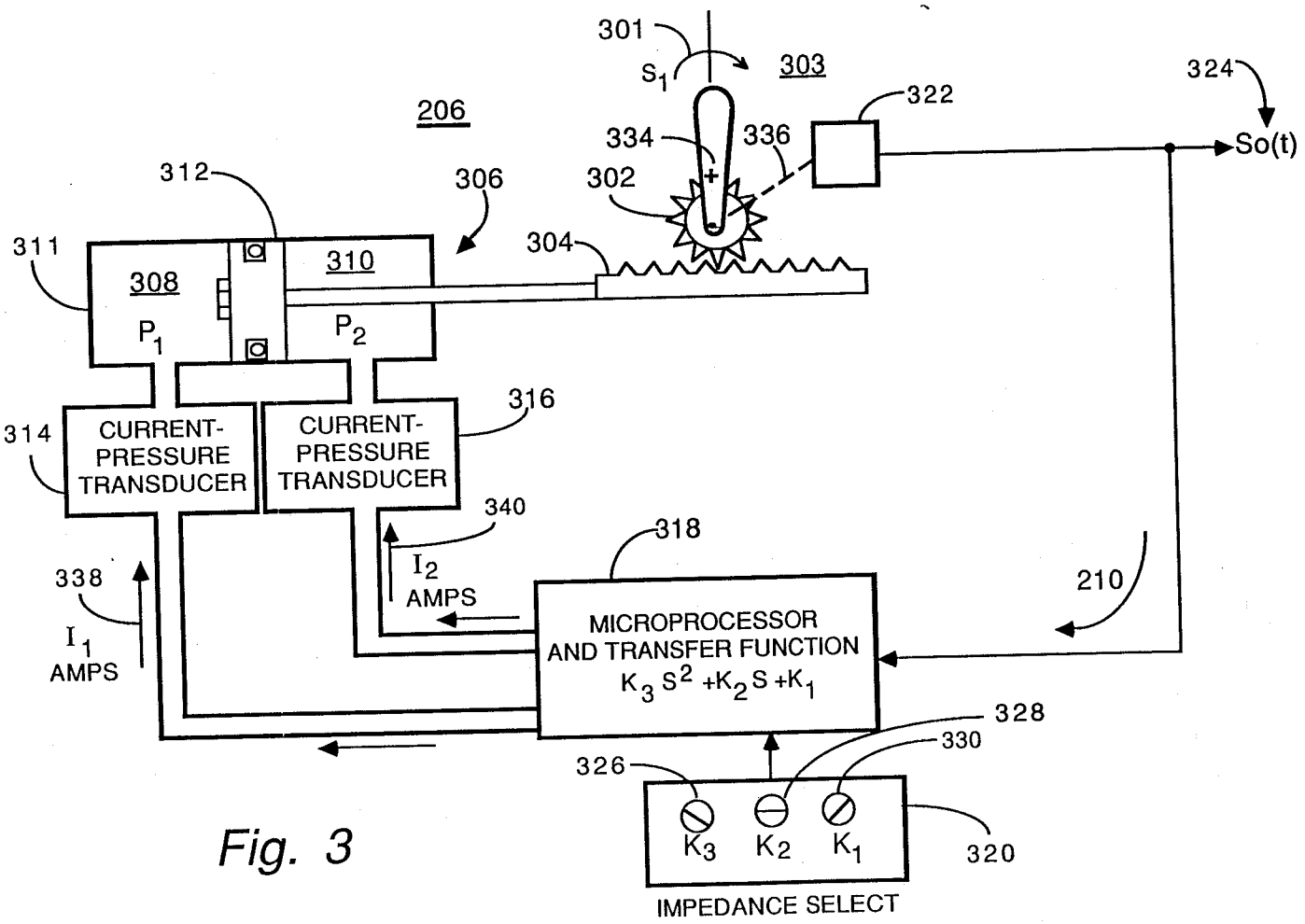
FIG. 3 shows additional details of a control stick system made in accordance with the present invention.

Additional details of a control stick system in accordance with the present invention are shown in FIG. 3 of the drawings. In FIG. 3, the feedback loop 210 is shown to include an embodiment of the transfer function 204 in the form of a programmed microprocessor 318. In FIG. 3 it is understood that certain conditions are imposed on FIG. 3, that is, that $K_3=M_x$, $K_2=B_x$, and $K_1=K_x$ in FIG. 2. The microprocessor 318 also receives input from an array of manual input controls 320 that determine the mathematical coefficients for the transfer function terms. A determination of transfer function terms in turn determines the mechanical impedance of the control stick 300 by way of locating the poles of the transfer function in the S-plane.

The force summation apparatus 206 in FIG. 2 is shown in FIG. 3 to include a plurality of component elements including the pressurized fluid cylinder and piston assembly 311, the control stick rack and pinion assembly 304-302 which is also generally designated by the number 303 and the transducer elements 314 and 316. Attending the control stick rack and pinion assembly 304-302 in FIG. 3 is a mechanical-to-electrical transducer device shown generally by the block 322 and coupled mechanically to the stick 300 as is indicated at 336 in FIG. 3. The output signal from the transducer of the block 322 is indicated at 324 in FIG. 3 and comprises the output of the FIG. 3 apparatus. The signal 324 is also applied to the microprocessor 318 for generation of the feedback loop signal.

Signals from the feedback transfer function block, i.e., the microprocessor 318, are converted into the mechanical forces receivable at the control stick 300 by way of a pair of electrical current to fluid pressure transducer elements 314 and 316 by which pressures in the cylinder chambers 308 and 310 are made proportional to the electrical current flows 338 and 340 originating in the transfer function block or microprocessor 318. Additional details concerning the pressure transducer elements 314 and 316 and the cylinder and piston assembly 311, including the gaseous or other types of pressurized fluid used and desirable electrical circuitry for the transducer elements 314 and 316 are to be found in U.S. Pat. No. 4,632,341 issued to D. W. Repperger et al.

The assembly 303 in FIG. 3 therefore includes a control stick 300 which may, for example, be pivoted about an axis 334 in order to move a gear member 302 which is engaged with the teeth of a rack member 304. According to the described and illustrated arrangement of the assembly 303, movement of the stick 300 by a human operator causes generation of an electrical signal in the transducers of block 322 and also causes movement of the piston 312 in the assembly 311. Conversely, movement of the piston 312 as a result of signals received from the microprocessor 318 will cause movement or force application to the stick 300 by way of the cylinder and piston assembly 311.

The ratio of the output signal $S_o$, 324, to a mechanical input movement signal $S_I$ (or alternately $\mu_c$) at the control stick 300 can be characterized by the transfer function $$S_o/S_I=1/(M_sS^2+B_sS+K_s) \quad (1)$$

where the $M_s$ term represents mass present in the control stick and rack and pinion assembly, $B_s$ indicates the amount of damping present in the assembly, $K_s$ indicates the spring constant applicable to the system, and $S_I$ represents the input signal which is mechanical in nature and indicated at 301 in FIG. 3. A transfer function of this nature maps into a complex conjugate pair of poles arising from the Ms $S^2+BsS+Ks$ terms. The signs and magnitudes of the coefficients $M_s$, $B_s$, and $K_s$ determine the locations of the poles on an S-plane map. Enclosure of the control stick assembly 303 in the feedback loop indicated at 210 in FIGS. 2 and 3 lives rise to a modification of the equation 1 transfer functions according to the well-known closed loop feedback relationship:

$$\text{output/input} = G/(1-GH) \quad (2)$$

where G represents the forward transfer function and $G=1/M_sS^2+B_sS+K_s$ and H represents the feedback path transfer function and $H=M_xS^2+BxSK_s$ and where the input signal and the feedback signal are summed with the same polarity in a summing node.

In FIG. 2 the summing node 212 is a positive polarity [as contrasted to the FIG. 1 showing]; this arrangement is shown later to give rise to the subtraction of mechanical impedances. This arrangement also additionally distinguishes the present invention from the apparatus described in my prior U.S. Pat. No. 4,447,043.

Application of this known feedback relationship to the systems shown in FIGS. 2 and 3 which include the indicated transfer functions for the control stick and the feedback path provides an overall system transfer function of $$S_O/S_I = \quad (3)$$

$$(1/(M_sS^2(+)B_sS(+)K_s))/\left(1-\frac{(K_3{}^2S(+)K_2S+K_1)}{(M_sS^2(+)B_sS(+)K_s)}\right.$$

or $$S_O/S_I = 1/((M_s-K_3)\,s^2+(B^S-K_2)s+(K^S-K_1)). \quad (4)$$

In comparing FIGS. 2 and 3, it may be noted that $K_3=Mx$. $K_2=Bx$, and $K_1=Kx$ for equations 2–4 to be consistent.

Since the characteristics of the control stick assembly 303 are presumed to be fixed and non-variable in nature, selection of the feedback transfer function coefficients $K_3$, $K_2$ and $K_1$ by the array of manual input controls 320 in FIG. 3, may be used as the arrangement for determining the overall value of the equation (4) coefficients $(M_s-K_3)$, $(B_s-K_2)$ and $(K_s-K_1)$ and thereby the mechanical characteristics of the control stick assembly 303. If, for example, a condition of $0<K_3<M_s$, and $0<K_2<B_s$ and $0<K_1<K_s$, then the overall coefficients in equation 3 above are positive, and the mechanical impedance of the control stick 300 is of reduced value. Alternatively, if $0<M_s<K_3$, and $0<B_s<K_2$, and $0<K_s<K_1$, the overall coefficients in equation 3 become negative in value, the poles of the overall transfer function are located in the right half of the S plane and the control stick impedance becomes negative. If in another alternative, the values of $K_3$ and $M_s$ are made equal, $K_2$ and $B_s$ are made equal, and $K_1$ and $K_s$ are made equal, it is possible for the control stick 300 to have zero impedance or in effect, no mass, no spring constant, or dashpot constant. Variation of the coefficients $K_1$, $K_2$, and $K_3$ individually, as is suggested in the array of input controls at 320 in FIG. 3, is contemplated in the invention.

Discrete electrical circuit realizations of the feedback transfer functions in blocks 204 and 318 herein may be used to embody the invention. Such hardware embodiments using operational amplifiers, threshold detectors, and digital logic may be preferable to the programmed microprocessor in some arrangements of the invention. The realization of electrical networks having the second order pole combinations resulting from the transfer functions of equations 2 and 3 above or the realization of these second order mathematical functions in the form of computer program algorithms is within the capability of persons skilled in the electrical network and computer programming arts. Individual potentiometers may be used to couple elections of the $K_3$, $K_2$ and $K_1$ constants at 26, 328 and 330 to the electrical network realization of transfer function or to the computer program transfer function realization.

Appendix A herein describes the realization of a transfer function of the type used at 104 in FIG. 1, the transfer function $H(S)=K_3S^2K_2S+K_1$. Appendix A is based on an analog apparatus realization and also indicates the mathematical basis for the realization. Additionally, Appendix B herein shows a digital computer realization of this same transfer function using FORTRAN language coding.

As indicated earlier herein, the presence of some degree of instability in an aircraft control stick has been found pleasing to pilots in order that a quickly responsive aircraft be achieved. The above-indicated right-hand s plane location of control stick transfer function poles and zeroes is, of course, compatible with this unstable-fast response condition.

The FIG. 3 disclosed control stick impedance determining apparatus is, of course, illustrative of a single-axis system. Commonly in aircraft and most other control stick arrangements, a two-axis system is desirable. Two-axis control stick impedance determination may, of course, be achieved by duplicating the FIG. 3 apparatus for a second axis—an axis which can be perpendicular to the plane of the FIG. 3 drawing, for example.

The ability to control inertias, dampings, and spring constants in the transfer functions and mechanical impedances of a control stick is desirable for accommodating a variety of operator tastes and utilization system demands. According to the present however, an electrical or electronic embodiment of a control stick feedback system allows the achievement of true negative impedance characteristics and moreover, accomplishes these characteristics at low cost in comparison with the heretofore practiced arrangements, and with the flexibility of specifying transfer function pole and zero locations with relative freedom.

While the apparatus and method herein described constitute a preferred embodiment of the invention, it is to be understood that the invention is not limited to this precise form of apparatus or and that changes may be made therein without departing from the scope of the invention, which is defined in the appended

APPENDIX A

Realization of the Transfer Function $K_3S^2+K_2S+K_1$

A realization of the transfer function $H(S)=K_3S^2+K_2S+K_1$, can be accomplished with a microprocessor using the following procedure. Let C(S) equal the output of the microprocessor and R(S) equal the input to the microprocessor. Then the relationship $$C(S)/R(S)=K_3S^2(+)K_2S(+)K_1 \quad (1)$$

is implemented by using $$C(S)/R(S)=(K_3S^2+K_2S+K_1)/(1+S/\alpha)^3 \quad (2)$$

where $\alpha$ is a large number, at least twice the value of the largest root of $K_3S^2+K_2S+K_1$. Then $$\frac{C(S)}{R(S)} = \frac{K_3S^2(+)K_2S(+)K_1}{\frac{1}{\alpha^3}S^3(+)3\frac{s^2}{\alpha^2}(+)3\frac{s}{\alpha}(+)1} \quad (3)$$

or $$\frac{C(S)}{R(S)} = \frac{\alpha^3\,[K_3S^2(+)K_2S(+)K_1]}{s^3\,(+)3\alpha S^2(+)3\alpha^2S(+)\alpha^3} \quad (4)$$

In the time domain (for zero initial conditions), this reduces to:

$$\dddot{C}_H(+)3\alpha\ddot{C}(+)3\alpha^2\dot{C}(+)\alpha^3C = \alpha^3K_3\ddot{R}(+)\alpha^3K_2\dot{R}(+)\alpha^3K_1R \quad (5)$$

to reduce this to state variable form, first convert the homogenous part, left hand side of equation (5) into state variable form. This is accomplished using:

$$\dddot{C}_H(+)3\alpha\ddot{C}_H(+)3\alpha^2\dot{C}_H(+)\alpha^3C_H=0 \quad (6)$$

if the state variables are selected as:

$$x_1=C_H \quad (7a)$$

$$x_2=\dot{C}_H \quad (7b)$$

$$x_3=\ddot{C}_H \quad (7c)$$

Then $$\dot{x}_1=x_2 \quad (8a)$$

$$\dot{x}_2=x_3 \quad (8b)$$

$$\dot{x}_3=-3\alpha x_3-3\alpha^2x_2-\alpha^3x_1 \quad (8c)$$

For the non-homogenous equation, assume:

$$\dot{x}_1=x_2+f_1(t) \quad (9a)$$

$$\dot{x}_2=x_3+f_2(t) \quad (9b)$$

$$\dot{x}_3=-3\alpha x_3-\alpha^2x_2-\alpha^2-\alpha^3x_1+f_3(t) \quad (9c)$$

where $f_1(t)$, $f_2(t)$, and $f_3(t)$ are to be determined. Rewriting (9*a*–*b*) yields:

$$x_2=\dot{x}_1-f_1 \quad (10a)$$

Now substitute into (9c):

$$x_3=\dot{x}_2=f_2=\ddot{x}_1-\dot{f}_1-f_2 \quad (10b)$$

and $$(\dddot{x}_1-\ddot{f}_1-\dot{f}_2)=-3\alpha[\ddot{x}_1-\dot{f}_1-f_2]-3\alpha^2[1-f_1-]-\alpha^3x_1+f_3 \quad (11)$$

or $$\dddot{x}_1-\ddot{f}_1-\dot{f}_2=-\alpha\ddot{x}_1+\alpha f_1+3\alpha\dot{f}_2-3\alpha^2\dot{x}_1+3\alpha^2f_1-\alpha^3x_1+f_3 \quad (12)$$

or $$\dddot{x}_1 3\alpha\ddot{x}_1+3\alpha^2\dot{x}_1+\alpha^3x_1=\ddot{f}_1+(\ddot{f}_2+3\alpha\ddot{f}_1)+(3\alpha f_2+3\alpha^2f_1+f_3) \quad (13)$$

wish to have equation (13) to be equivalent to equation (5). This is accomplished using $$f_1=\alpha^3K_3R \quad (14)$$

and $$\dot{f}_2+3\alpha[\alpha^3K_3\ddot{R}]=\alpha^3K_2\dot{R} \quad (15)$$

or $$f_2=[\alpha^3K_2-3\alpha^4k_3]R \quad (16)$$

and $$(3\alpha f_2+3\alpha^2f_1+{}_3f\,)=\alpha^3K_1R \quad (17)$$

or $$3\alpha[\alpha^3K_2-3\alpha^4K_3]R+3\alpha^2[\alpha^3\alpha^2[\alpha^3K_3]R=\alpha^3K_1R \quad (18)$$

or $$f_3=[\alpha^3K_1-\alpha^5K_3-3\alpha^4K_2+9\alpha^5K_3] \quad (19)$$

and since R is the input, we let $$a=\alpha^3K_3 \quad (20a)$$

$$b=\alpha^3K_2-3\alpha^4K_3 \quad (20b)$$

and $$c=\alpha^3K_1-3\alpha^5K_3\alpha^4K_2+9\alpha K_3 \quad (20c)$$

The state variable equations [9*a*–*b*]become $$x_1=x_2+AR \quad (21a)$$

$$x_2=x_3+BR \quad (21b)$$

$$x_3=-3\alpha x_3-3\alpha^2x_2-\alpha^3x_1+CR \quad (21c)$$

Figure 4:
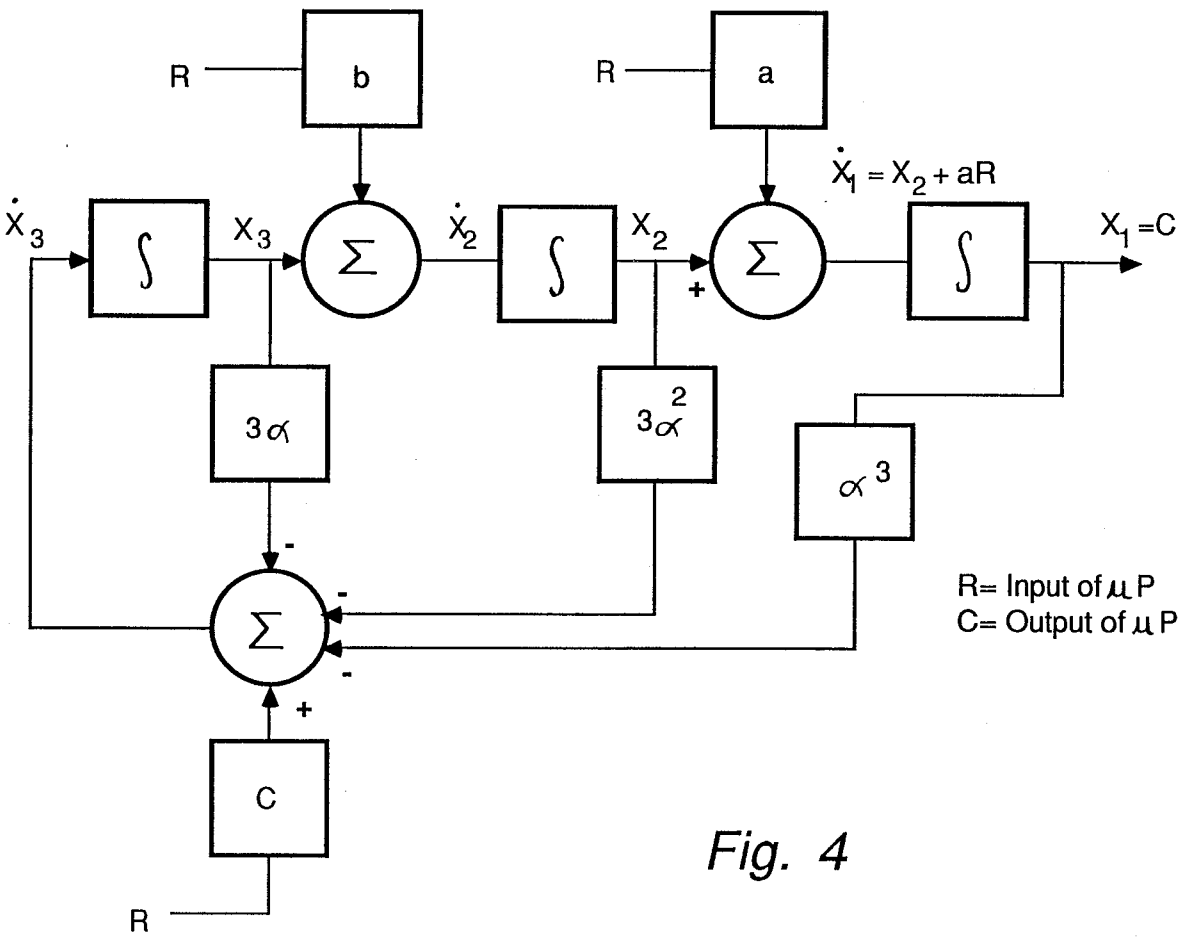
FIG. 4 shows an analog simulation of a feedback transfer function relating to appendix A herein.

These equations can be simulated with the three integrator analog system of FIG. 4.

APPENDIX B

FORTRAN CODE SIMULATION OF THE MICROPROCESSOR REALIZATION IN APPENDIX A

```
      PROGRAM MAIN (INPUT,OUTPUT,TAPE5=INPUT,TAPE 6=OUTPUT)
      DIMENSION X1(101),X2(101),X3(101),R(101),C(101)
      1 DX1(101),DX2(101),DX3(101)
C     READ THE INPUT TIME SERIES R(T)
      READ(S)R(I),I=1,101
C     INITIALIZE THE ZERO INITIAL CONDITIONS ON X1,X2,AND X3
      X1(1)=0.0
      X2(1)=0.0
      X3(1)=0.0
C     DEFINE DELTA T, THE TIME STEP
      DELTAT=.01
C     DEFINE ALPHA,THE CUTOFF FREQUENCY
      ALPHA=50.
C     DEFINE K1,K2,AND K3-CALL THEM XK1,XK2,AND XK3
      XK1=1.0
      XK2=4.0
```

APPENDIX B-continued

FORTRAN CODE SIMULATION OF THE MICROPROCESSOR REALIZATION IN APPENDIX A

```
      XK3=4.0
C     DEFINE THE LITTLE A,B,C COEFFICIENTS
      A=((ALPHA)**3)*XK3
      B=((ALPHA)**3)*XK2-(3.)*((ALPHA)**4)*XK3
      C=((ALPHA)**3)*XK1-(3.)*((ALPHA)**5)*XK3-(3.)*((ALPHA**4)*XK2
     1 +(9.)*((ALPHA)**5)*XK3
C     NOW INTEGRATE THE STATE EQUATIONS FORWARD
      DO 1 I=1,100
      DX1(I)=X2(I)+A*R(I)
      DX2(I)=X3(I)+B*R(I)
      DX3(I)=-(3.)*ALPHA*X3(I)-3.*((ALPHA)**2)*X2(I)-((ALPHA)**3)
     *X1(I)+C*R(I)
C     NOW UPDATE THE NEXT TIME STEP
      J=I+1
      X1(J)=X1(I)+DELTAT*DX1(I)
      X2(J)=X2(I)+DELTAT*DX2(I)
      X3(J)=X3(I)+DELTAT*DX3(I)
I     CONTINUE
C     WRITE IT OUT
      TIME=0.0
      PRINT(6,3)
      DO 2 I=1,101
      PRINT(6,4)TIME,X1(I),X2(I),X3(I)
      TIME=TIME+DELTAT
2     CONTINUE
3     FORMAT(1X,SHTIME=,8X,6HX1(T)=,8X,6HX2(T)=,8X,6HX3(T)=,1)
4     FORMAT(1X,F5.2,3(3X,F11.5))
      END
```

We claim:

1. Aircraft controlling apparatus comprising the combination of:

a manually operable electrical output signal generating aircraft control stick apparatus having a first mathematical transfer function:

an electrical signal input to mechanical signal output feedback signal apparatus connected between the electrical signal output of said control stick apparatus and a mechanical input node thereof, the combination of said feedback signal apparatus with said control stick apparatus having a second closed loop transfer function which includes selectable dynamic stability characteristic determining mathematical constant terms therein;

means selective of said transfer function dynamic stability determining mathematical constant term values for selecting stability and instability characteristics and characteristics intermediate thereof in said control stick apparatus.

2. The aircraft controlling apparatus of claim 1 wherein said first transfer function has the mathematical form of:

$$S_O/S_I=1/(M_sS^2+B_sS+K),$$

and said second transfer function has the mathematical form of $$S_O/S_I=1/[(M_s-K_3)S^2+(B_s-K_2)S+(K_s-K_1)],$$

with the mathematical constant term $M_s-K_3$ measuring physical mass quantity, the mathematical constant term $B_s-K_2$ measuring viscons friction quantity, and the mathematical constant term $K_s-K_1$, measuring spring constant, and wherein said means selective of dynamic stability determining mathematical constant term values includes mathematical constant values electable between the limits of:

$K_3$, $K_2$, and $K_1$ being numerically smaller than $M_s$, $B_s$ and $K_s$ respectively and $K_3$, $K_2$ and $K_1$ being numerically larger than $M_s$, $B_s$ and $K_s$ respectively.

* * * * *